United States Patent [19]

von Lersner et al.

[11] Patent Number: 4,554,955

[45] Date of Patent: Nov. 26, 1985

[54] METHOD AND APPARATUS FOR ASSEMBLING FOOD INGREDIENTS

[75] Inventors: Wolf A. von Lersner; Edward W. Cheeseman, both of Cherry Hill; Thomas K. Simpson, Merchantville; George R. Weaver, Maple Shade, all of N.J.

[73] Assignee: Campbell Soup Company, Camden, N.J.

[21] Appl. No.: 498,018

[22] Filed: May 25, 1983

[51] Int. Cl.[4] .............................................. G06F 15/46
[52] U.S. Cl. ....................................... 141/1; 141/104; 141/311 R; 364/478; 364/479
[58] Field of Search .................... 141/1, 9, 83, 94, 100, 141/104, 311 R; 215/365; 364/424, 425, 468, 478, 479

[56] References Cited

U.S. PATENT DOCUMENTS

| | | | |
|---|---|---|---|
| 3,612,321 | 10/1971 | Larson | 215/365 |
| 3,639,728 | 2/1972 | Helfand et al. | 364/478 |
| 3,650,303 | 3/1972 | Chambers et al. | 141/1 |
| 3,796,239 | 3/1974 | Zindler et al. | 141/94 X |
| 4,294,682 | 10/1981 | Deczky | 364/478 X |
| 4,469,149 | 9/1984 | Walkey et al. | 141/94 |

*Primary Examiner*—Stephen Marcus
*Assistant Examiner*—Mark Thronson

*Attorney, Agent, or Firm*—Albert L. Free

[57] ABSTRACT

A system for verifying that the proper ingredient-containing transport containers have been assembled at a particular soup-blending kettle, in which a hole-coded metal key is permanently affixed to each container and provided with an array of machine-readable holes corresponding to a number unique to each container. At the ingredient-dispensing station, a key-reader reads out the identifying number of the container and transmits it to that kettle station to which the container is to be delivered. The transport container is then delivered to the kettle station, where the key code is again machine read; the container number thus read out at the kettle station is compared with that previously transmitted from the ingredient-dispensing station, and if they both represent the same number then the proper container has been delivered to the kettle station and its contents are dumped into the kettle. To prevent dumping of ingredients of a "wrong" container, the container can be locked at the dispensing station and only unlocked at the kettle station in response to a control signal indicative of identity between the remotely-read key and the key read at the kettle occurs. In other cases an unlocked transport container is delivered onto an automatic dumper, which is enabled only in response to an indication by the control signal that the proper container is present.

19 Claims, 13 Drawing Figures

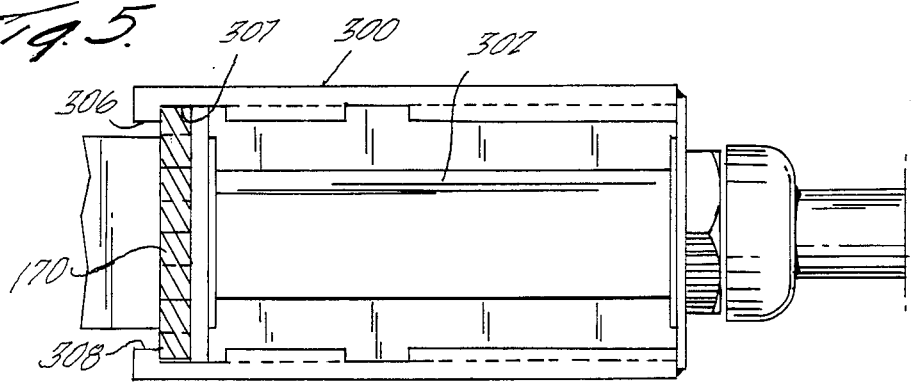
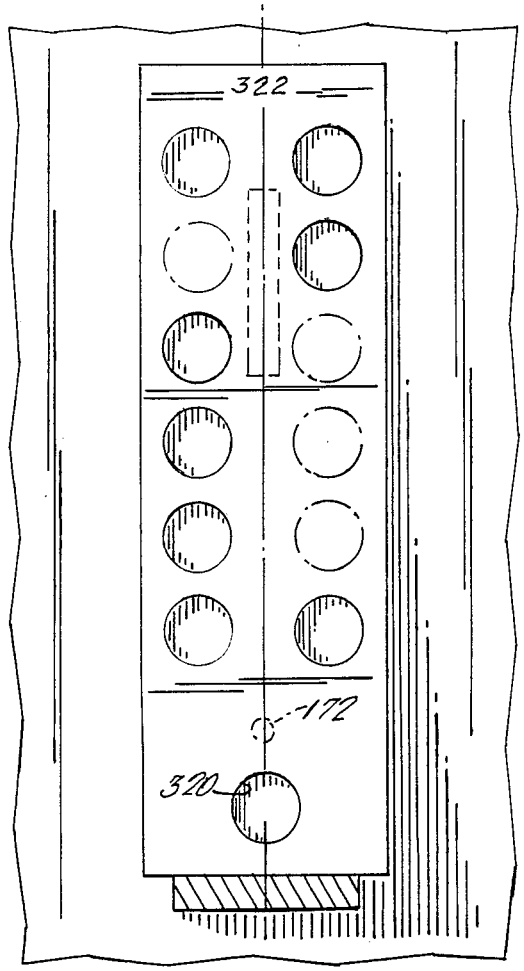
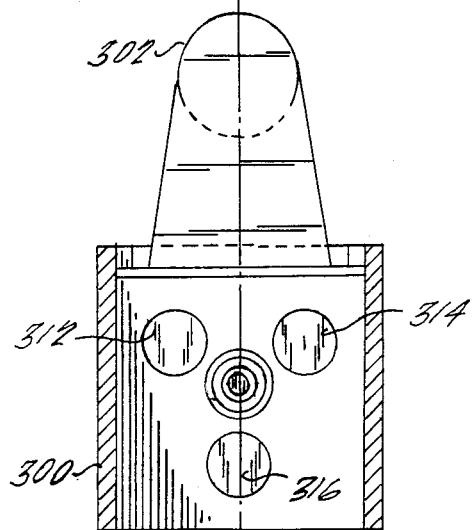

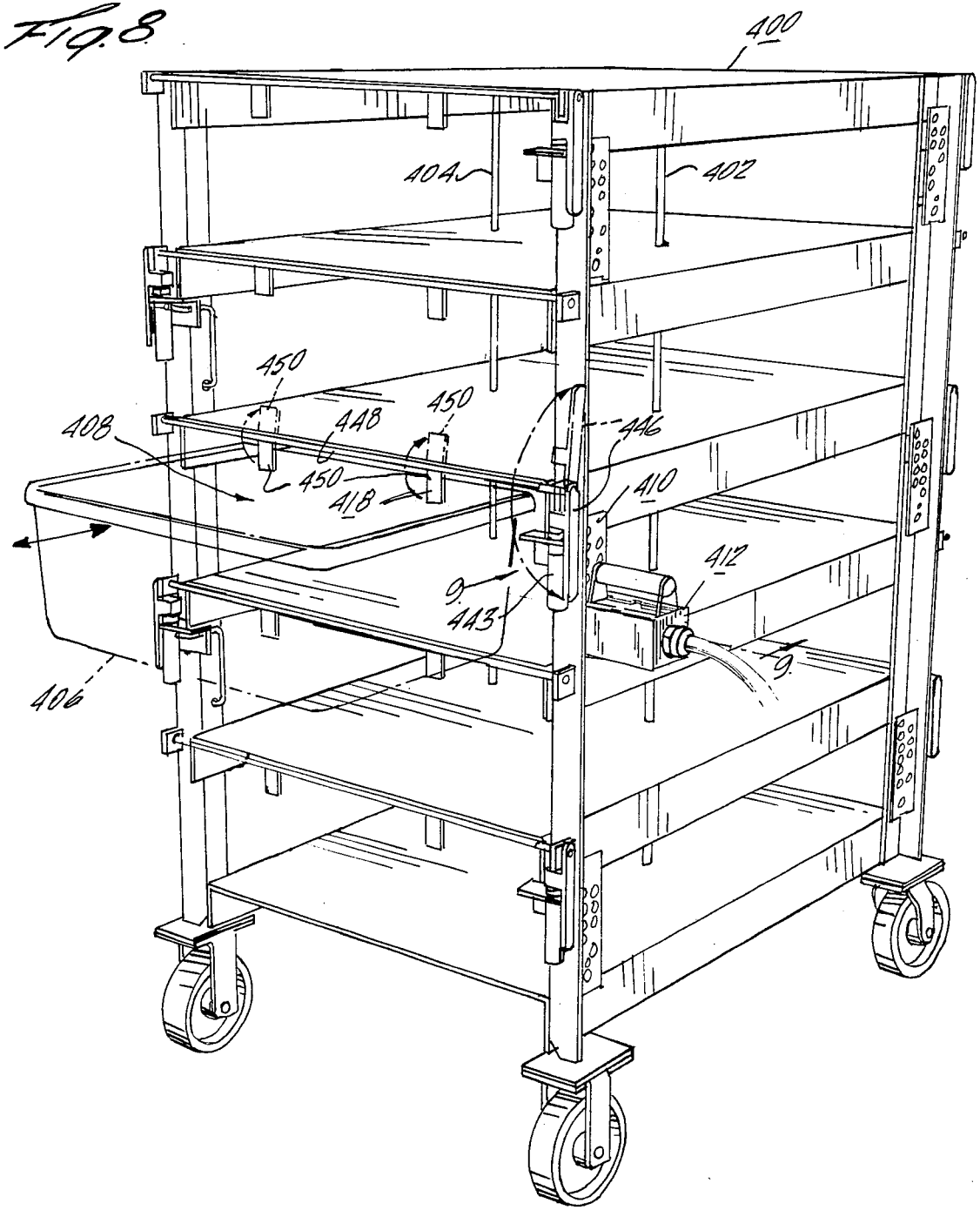

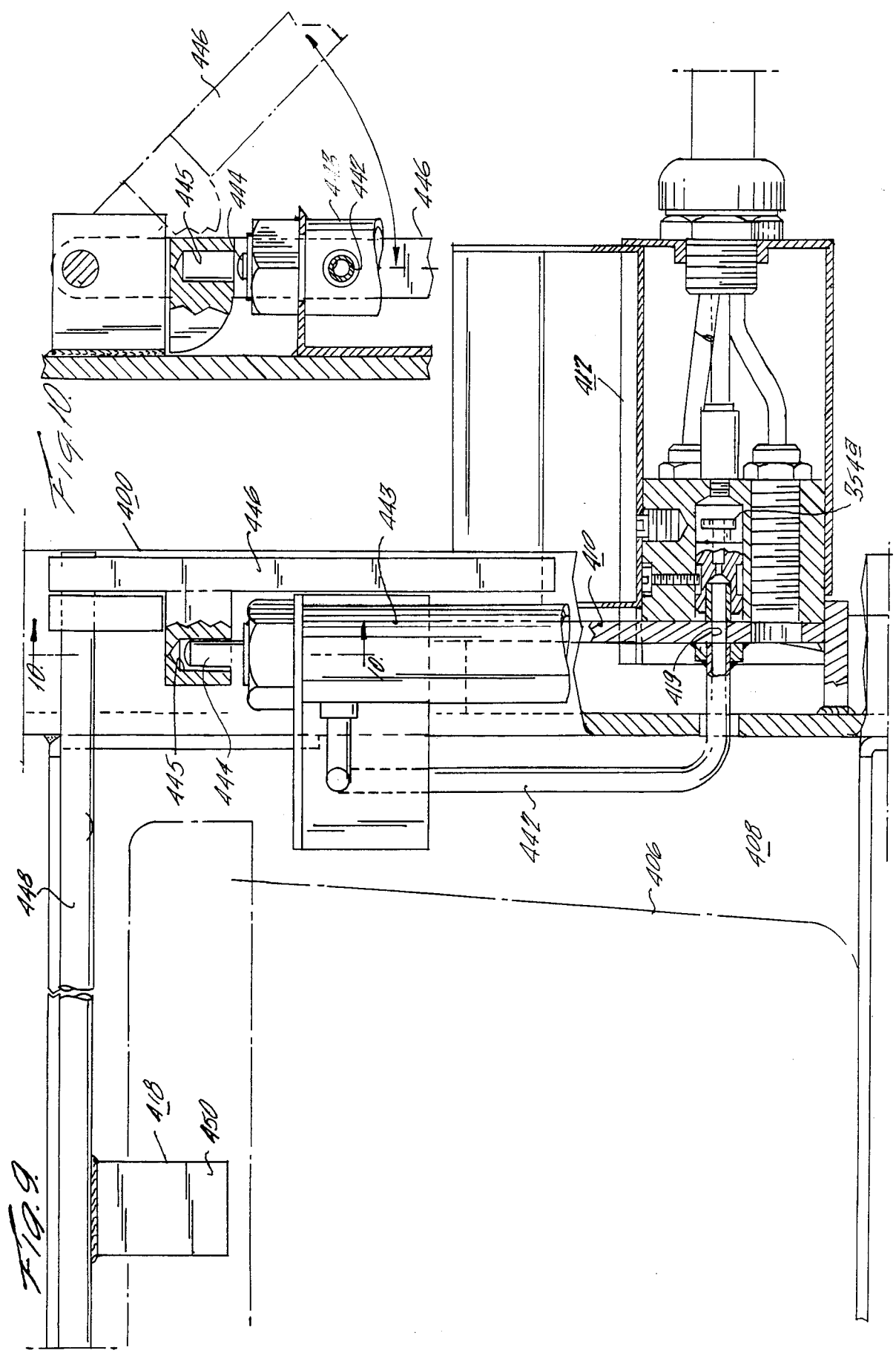

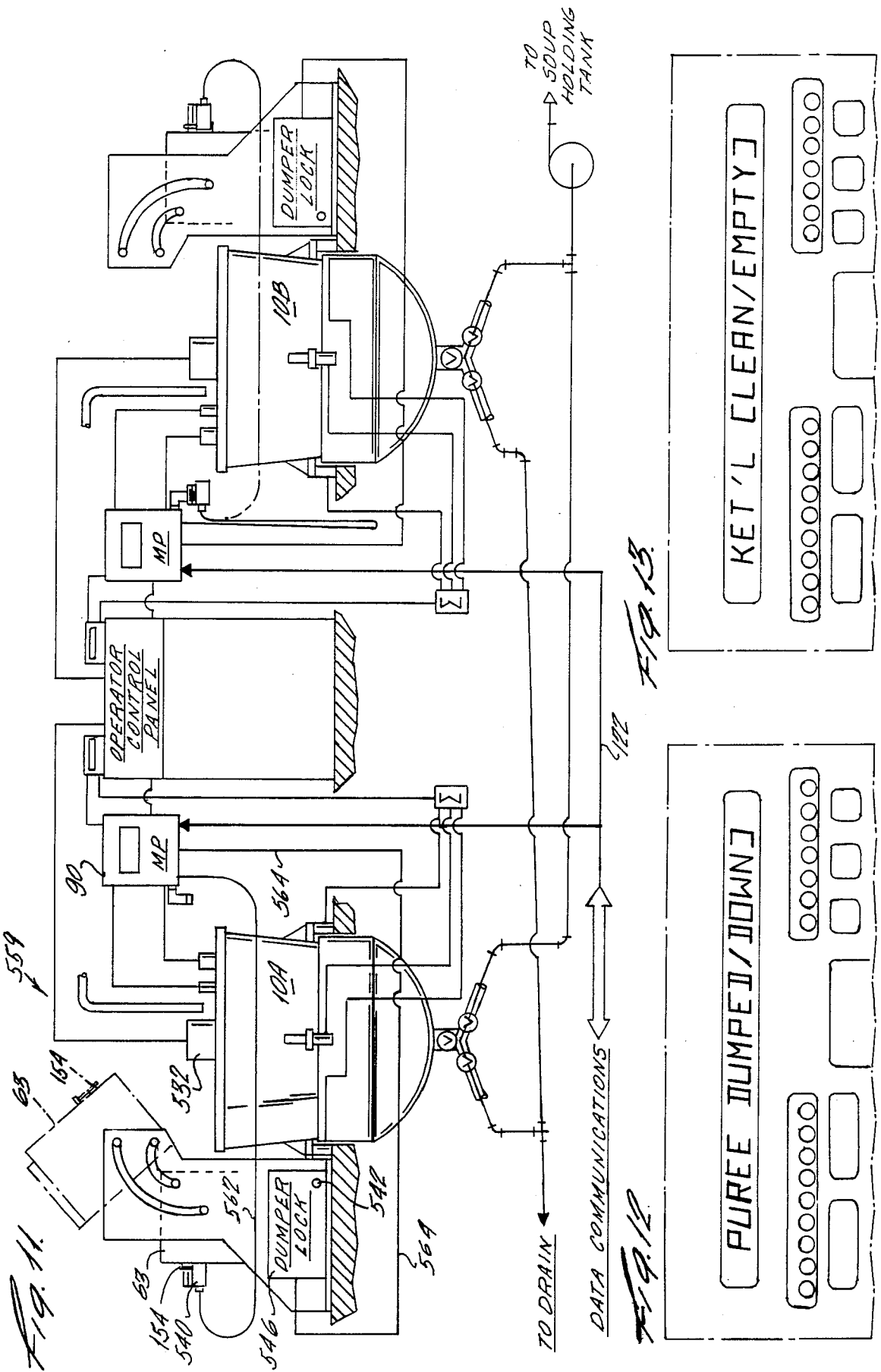

METHOD AND APPARATUS FOR ASSEMBLING FOOD INGREDIENTS

BACKGROUND OF THE INVENTION

In the preparation of food products, for example soups, it is common to store various ingredients of the final product at different locations in a plant and to bring these ingredients in appropriate amounts from their storage places to blending stations where they are assembled in appropriate kettles, in accordance with predetermined recipes.

As an example only, the main solid ingredients, the spices, the condiments and the preservatives may be stored at different locations in a plant, remote from the blending kettles; in a plant utilized in the production of mushroom soup and chicken soup, as an example, mushrooms and diced chicken may be stored at different dispensing stations in a bulk solid-ingredient storage area, condiments may be stored in a condiment-storage room, appropriate spices may be stored in a spice storage room, and preservatives such as sodium glutamate may be stored in a preservative storage room in the same plant.

Also, typically there may be a plurality of different blending kettles in the plant, each to be used in preparing a particular batch of a particular soup or other food products. In general, in such examples what is ordinarily desired is to transport the right kinds and amounts of ingredients—i.e. bulk ingredients, condiments, preservatives and spices, etc. to a particular one of the blending kettles at a blending station, in accordance with the corresponding recipe, and to reduce the risk that the wrong ingredients may reach any of the kettles.

According to one procedure used previously for accomplishing such assembly of ingredients, transport containers in the form of large drums on wheeled carriers are provided, and one or more employees wheel the transport containers to the appropriate ingredient-storage stations to fetch the desired ingredients, as determined by a list which each involved employee carries with him. Thus if an employee is provided with a list requesting chicken soup, he may wheel the transport container to the bulk solid-ingredient storage area, weigh the amount of diced chicken indicated by his list into the transport container, and then wheel the container to the blending station. Another transport container is wheeled to the preservative room, the appropriate amount of preservative placed in the container, and the container then wheeled to the blending kettle. Typically, the appropriate relatively small amounts of preservatives and of spice are delivered to the blending kettle in what is commonly called a spice cart, by wheeling the spice cart to the spice room, putting into it trays containing the amounts and type of spice indicated by the recipe list, and then wheeling the spice cart to the blending kettle. Another employee serving as a checker is stationed at the blending kettle to check that the desired kinds and amounts of ingredients have been assembled at the kettle for the recipe to be made up in that kettle. All of the assembled ingredients are dumped at appropriate times into the kettle for blending, and usually for heating, to make the desired soup.

Some of the difficulties of such systems are that they are expensive in requiring a checker to check carefully the assembled ingredients, and they are subject to error, to a degree, depending upon how careful or how negligent the fetching employee and the checker may be.

One significant type of error which may arise in the latter type of operation is that a transport container may be taken to the wrong blending kettle and its contents dumped into that wrong kettle to produce a non-standard batch of blended product.

It is an object of the present invention to provide new and useful apparatus and method which will mitigate the costs and reduce the errors occurring in the above-described prior-art method and system.

A further object is to increase the certainty of the delivery of the proper ingredients, in the proper proportions, to the proper assembling or blending station.

SUMMARY OF THE INVENTION

These and other objects and features of the invention are realized by the provision of a method and apparatus in which the transport containers have respectively different machine-readable identification means affixed thereto, and first identification-reading means are provided at the ingredient-dispensing stations which read the identification means of each transport container presented thereto to produce first electrical signals representative of the identity of the transport container being presented to it. Second identification reading means are associated with the ingredient-receiving container, such as the blending kettle, for reading the identification means of the transport containers presented thereto to produce second electrical signals representative of the identities of such transport containers. Means are also provided for comparing the first and second electrical signals with each other to produce third comparison signals indicative of whether the proper transport container has reached the proper ingredient-receiving station, and if so to authorize emptying of the transport container into the ingredient-receiving container or kettle.

Preferably, the normal dumping of the various ingredients into the receiving container is inhibited until the authorizing third signals are produced, by the use of dump-inhibiting means which, for containers carrying bulk ingredients, may inhibit operation of an automatic dumping apparatus, and for smaller batches of ingredients such as spices, etc. may secure the smaller ingredient batches within a locked cart until the third comparison signals are produced.

In a preferred embodiment, microprocessor control means and identification reading means are provided for each ingredient-dispensing station and for each ingredient-receiving station, and the microprocessor control means are connected together and preferably with a master computer, to effect the operation described. The identification-reading means preferably comprises a metal key secured to each transport container and having a coded array of holes through it corresponding to the identification number of the transport container to which it is affixed.

The identification reading means preferably comprises a hole-sensing reader head secured to the associated microprocessor control means by an umbilical cable containing electrical, and preferably also pneumatic, connectors. The microprocessor means preferably comprise suitable stored program information, and data input means and read-out means for prompting an operator to lead him through an appropriate sequence of operations and responses to properly load each transport container with ingredients.

In the normal operation of the preferred form of the system, the person designated to assemble the ingredients for making a particular soup is given a list of the kinds and amounts of ingredients to be assembled at a particular kettle. For each bulk ingredient, he takes a drum or the like to a dispensing station for that ingredient, places it on a scale which is electronically connected to the associated microprocessor control unit, and applies the associated key reader to the key on the container. The key reader reads the coded number on the key and transmits it to the kettle station to which the container is to be delivered. The reader and microprocessor preferably also respond by indicating on the display the desired weight of ingredient to be dispensed into the transport container, and preferably cause the previously-locked ingredient dispenser to become unlocked so that the operator may dispense the ingredient. In addition, the display preferably shows the instantaneous ingredient weight of dispensed material in the transport container, and the operator fills until the commanded weight of ingredient has been added. During this time, and in response to the reading of the container identification number by the reader, the reader head has preferably been held locked to the key in response to a pneumatic signal delivered over the umbilical cable to the reader head. When the desired weight of product has been dispensed into the container, the reader head preferably is automatically unlocked from the key, and when the reader head is subsequently removed by the operator the microprocessor is caused to transmit the weight of dispensed product to the microprocessor at the kettle into which the dispensed ingredient is to be dumped.

The operator then takes the ingredient-containing transport container to the selected kettle and, at an appropriate time preferably indicated by the kettle microprocessor, places it on a dumper; the operation of the dumper is inhibited until the key reader at the kettle has read the key on the transport container and has read out a number the same as that previously transmitted to it from the microprocessor at the ingredient-dispensing station. When that occurs, the kettle microprocessor preferably releases the inhibiting mechanism of the dumper and the dumper is operated to deliver the contents of the transport container to the proper kettle.

In the case of the smaller quantity ingredients such as spices, a cart with a plurality of normally-locked compartments is provided, each compartment being adapted to receive a tray for carrying the spices. Each compartment has a machine-readable key associated with it on the cart, each key being coded with a different number unique to the system. At the spice-dispensing station, an employee is cued by the display on the associated microprocessor control means to weigh out the proper amounts and kinds of spices for the recipe to be assembled in the kettle. A key reader and umbilical cable similar to that described above is provided at the spice-room station, which when applied to a key on the cart to read the coded number of a compartment of the cart, pneumatically unlocks the corresponding compartment so that the weighed-out spices can be placed in that compartment; when the key reader is removed, the compartment is relocked so that its contents cannot change on its trip to the kettle. The microprocessor again sends the identification number of the chamber and data indicating the type and amount of spice loaded on the cart, to the kettle station. When the cart has been wheeled to the kettle station, the key reader at the kettle is applied to the key of the appropriate compartment, and upon reading out of the proper key number and electronic comparison of it with the compartment number previously sent to the kettle microprocessor, the kettle microprocessor pneumatically unlocks the cart compartment containing the proper spices for manual dumping into the kettle.

The program for the system may provide for many other controls, monitoring operations, checks and data displays or read-outs, operating in conjunction with the above-described system for verifying that the proper kind and amount of ingredient is being delivered into the blending kettle.

BRIEF DESCRIPTION OF FIGURES

These and other objects and features of the invention will be more readily understood from a consideration of the following detailed description, taken with the accompanying drawings, in which:

FIGS. 5, 6 and 7 are views taken along lines 5—5, 6—6 and 7—7 of FIG. 4;

FIG. 8 is a perspective view of one form of small-ingredient or "spice" cart used in one preferred embodiment of the invention;

FIG. 9 is a view taken along lines 9—9 of FIG. 8;

FIG. 10 is a view taken along lines 10—10 of FIG. 9;

FIG. 11 is a schematic elevational view of two kettles and associated equipment used in the preferred embodiment; and FIGS. 12 and 13 are fragmentary front elevational views of the microprocessor displays for the two kettles of FIG. 11, showing two different and typical display messages.

DETAILED DESCRIPTION OF SPECIFIC EMBODIMENTS

Figure 1:
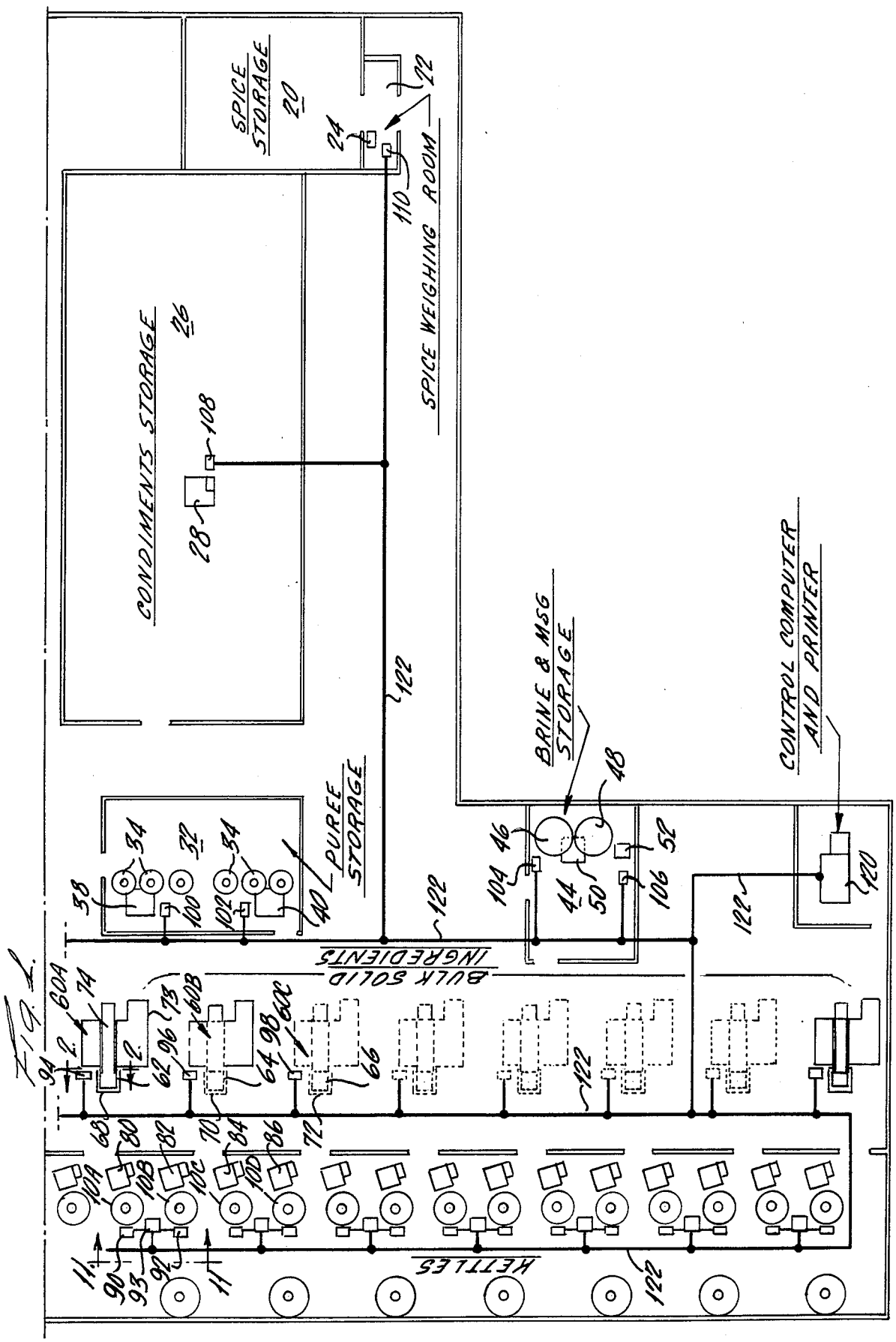
FIG. 1 is a schematic plan view of a portion of a floor of a soup-making plant, to which the invention is applied by way of example.

Referring now to the embodiment of the invention shown in the drawings by way of example only, FIG. 1 illustrates one possible floor plan of a part of a floor of a soup-making plant, showing possible locations for the several blending kettles and for the ingredient-storage rooms or areas, as well as appropriate positioning of an arrangement of the electronic and pneumatic apparatus preferably utilized in accordance with the present invention.

More particularly, in FIG. 1 there is shown a row of some fifteen blending kettles such as 10A, 10B, 10C and 10D, arranged along one end of the floor of a soup-producing plant. The blending kettles may be entirely conventional for this purpose, and typically each pair of blending kettles will have associated with it a corresponding holding tank such as 12 and 14, associated respectively with kettle pairs 10A,10B and 10C,10D. Not shown in detail are the conventional supplies of water and cleaning materials for cleansing the blending kettles between successive uses, and the sources and supply systems for supplying the principal liquid bulk of the soup to the kettles, which is commonly done by flowing it through appropriate pipes or conduits in a manner well known in the art.

Typical storage locations for the other ingredients of the soups are also illustrated in FIG. 1. Thus there is shown a spice storage room 20 communicating with a spice weighing room 22 containing a relatively small spice-weighing scale 24; a condiments storage room 26 containing a relatively small weighing scale 28; a puree storage room 32 containing tanks such as 34 of puree with appropriate dispensing hoses and, in this case, a pair of larger weighing platforms 38 and 40; and a brine and monosodium glutamate (MSG) storage room 44 containing a brine storage tank 46 and an MSG storage tank 48, together with a relatively large weighing platform 50 for the brine and a relatively small scale 52 for the MSG.

Figure 2:
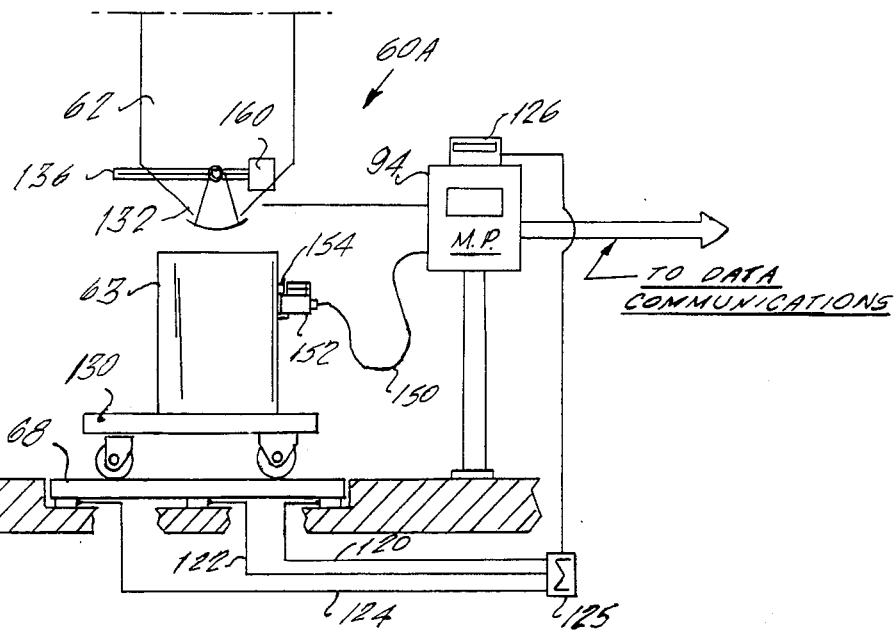
FIG. 2 is a schematic elevational view of an ingredient-dispensing station, as viewed along lines 2—2 of FIG. 1.

Also provided is a storage area 60 for bulk solid ingredients comprising, in this example, a plurality of bulk solid ingredient-dispensing hoppers such as 62, 64 and 66 beneath which are located relatively large weighing platforms, 68, 70 and 72, respectively, an example of which is shown more clearly in FIG. 2. Appropriate tables and delivery belts such as 73,74 for preparing and delivering the solid ingredients to their respective hoppers in conventional manner are shown schematically in FIG. 1. Typical of the bulk solid ingredients are diced chicken parts, mushrooms, tomatoes, etc. one of which types of ingredient would be stored in each of the hoppers.

In this arrangement it is assumed that adjacent pairs of blending kettles such as 10A,10B are used alternately on a given day to make a particular type of soup, one of the kettles being used to blend ingredients and make the soup while the other one is being cleaned and prepared for the blending and soup-making operation.

In such a system it is known to dispatch personnel with appropriate transport containers, such as large drums on wheeled dollies, to the various bulk-ingredient storage locations to fetch the bulk ingredients which are required in relatively large quantities, and to bring them back to a position adjacent the blending kettle into which they are to be dumped. In the case of the larger-quantity ingredients, the wheeled vehicle may be wheeled onto one of the larger weighing platforms shown, the tare weight noted, and a prescribed quantity of the bulk ingredient dispensed into the transport container by the operator, by operating a manual dispensing valve and observing the weight above tare weight, as it increases toward the desired value.

Similarly, it is known to provide spice carts on wheels, which persnnel are instructed to wheel to the areas such as the spice weighing room where small-quantity ingredients are kept, and where an attendant will weigh out the appropriate amounts and types of spices, MSG, etc. and place them in spice trays in the spice cart, after which the carts are wheeled back to an appropriate position adjacent the kettle in which the corresponding batch of soup is to be made.

As pointed out above, in such a system and with such an arrangement, even with ordinary care the person procuring the ingredient and bringing it back to the kettle, or the checker normally stationed at the kettle to be sure that the proper kinds and amounts of ingredients are present, may make a mistake; or, something can happen to the ingredients in transit, with a result that the amounts and relative proportions of ingredients dumped into the blending kettle may depart from the ideal. The principal purpose of the present invention is to reduce substantially the possibility and likelihood of such errors occurring, thereby improving the uniformity of the product produced.

In an example of the invention now to be described, it is assumed that each blending kettle is provided with an automatic dumper, such as 80, 82, 84 and 86 for blending kettles 10A, 10B, 10C and 10D respectively. As will be described later herein in more detail, when one of the large transport containers is to be dumped into a blending kettle, it is placed on an automatic dumper which, when it is enabled and when the operator operates its control button, lifts and turns the transport container, while holding it securely, so as to dump its contents automatically into the adjacent kettle.

Still referring to FIG. 1 for an indication of a preferred general disposition of certain primary elements of the invention in a complete system, each of the blending kettles has positioned adjacent it a microprocessor control system, hereinafter sometimes designated as a remote terminal unit or RTU, such as RTU 90 for blending kettle 10A and RTU 92 for blending kettle 10B. Also shown are chef's control panels such as 93, one for each adjacent pair of kettles, by which the assigned chef may control the blending, heating, dispensing and cleaning operations and in which programs and data from the remote microprocessor may be stored.

Similar, and preferably substantially identical, RTU's, such as 94, 96 and 98 are positioned adjacent each of the bulk product dispensing stations such as 60A, 60B and 60C; in this example, two substantially-identical RTU units 100 and 102 are situated adjacent to the two weighing platforms in the puree room 32, two more denoted as 104 and 106 are positioned adjacent the brine and MSG dispensing units, one denoted 108 is positioned adjacent the weighing platform 28 in the condiment storage room 26, and still another is positioned in the spice-weighing room and denoted as 110. Also preferably employed is a master control computer and printer 120, which may be remote from the ingredient storage and soup making areas. By means of the branching data communications cable 122, each of the kettle RTU's is in two-way communication with the master control computer and with each of the RTU's at the ingredient-dispensing stations; the latter RTU's are also in two-way communication with the master control computer over cable 122.

It will be further understood that FIG. 1 is intended to represent only a part of a larger soup making floor, which may contain additional blending kettles, holding tanks and ingredient-dispensing apparatus, including apparatus for dispensing different types of ingredients than are suggested in the drawing, depending upon what product it is desired to make in a particular kettle.

With the general layout of FIG. 1 in mind, individual parts of the system, significant to the present invention, will be described in greater detail with respect to the remaining figures.

Thus FIG. 2 is illustrative of one of the bulk-ingredient weighing stations such as 60A of FIG. 1, and corresponding numerals are therefore employed. A conventional floor-recessed weighing platform 68 is shown, provided with three conventional load cells which produce weight-indicating output signals on three lines 120, 122 and 124, which are conventionally combined in a totalizer 125 so as to operate properly a weight scale 126, this latter weighing portion of the system being entirely conventional and commercially available. The large transport container 63, in the form of a cylindrical drum, is shown in position on a wheeled dolly 130, its open top centered below the outlet opening 132 of the bulk-ingredient dispensing hopper 62, the dispensing outlet of which in this exwample can be manually controlled, when unlocked, to an opened or closed position by operation of a handle 136. The microprocessor RTU 94 is appropriately floor mounted and connected through an umbilical cable 150 to an indicia-reading head 152, which in the position shown is temporarily secured to a key 154 carried on the side of container 63 and bearing unique coded indicia to be read by the reader. The details of this latter arrangement are shown and will be described with reference particularly to FIG. 4 hereof.

Microprocessor RTU 94 is also connected to a dispenser locking device 160, so that the RTU 94 can lock or unlock the dispenser control arm 136 as appropriate at various times in the process.

Referring now in particular to FIGS. 4-7 showing a preferred form of the key and key reading device, the transport container 63 has welded to one side thereof a key which comprises a metal plate 170 having apertures therethrough shown by the shaded circles in FIG. 6; the unshaded circles taken together with the shaded circles are intended to represent the positions at which holes may or may not be present in the keys of different containers. That is, each container will have a different combination of holes through it, each however in one of the positions shown, and in each case the single bottom hole is present. The small central circle shown in phantom line at 172 indicates the position of an additional opening which is provided through the plate in the case of those keys which are on the spice carts, as will be described subsequently.

While there are many forms of key device which could be employed for the present purposes, in this example the code uses a base-three system; that is, for the bottom two hole positions the presence of a right-hand hold only indicates $\phi$, the presence of both holes indicates 1, and the presence of a left hole only indicates 2, while for the pair of holes immediately above the bottom pair a right-hand hole only indicates $\phi$, the presence of both holes indicates 3 and the appearance of a left-hand only indicates 6, i.e., the digits represented are three times greater than those for the lowest pair. This increasing by a factor of three applies progressively to the other progressively higher hole positions or possible hole positions. It will be appreciated that, by summing the numbers represented by the six hole-pair positions, any number from 0 to 728 may be represented and in the example shown the number represented happens to be 322, which is preferably also stamped into the key for easy visual observation thereof as shown.

The key reader in this case comprises a rectangular casing 300 provided with an external handle 302 and having, along its forward end, turned-in flanges such as 306,308 (FIG. 5) defining a channel 307 into which the key can be slipped, that is the key reader can be placed over the top of the key and moved downwardly along it to a bottom stop position.

In this example the key reader preferably includes three metal-sensor devices 312, 314 and 316 (FIGS. 4 and 7), sensors 312 and 314 being positioned with respect to each other and with respect to the reader so that as the key reader is moved down the key these two sensors align themselves successively with the successive pairs of possible hole positions in the key; sensor 316 is positioned to align itself with the bottom hole 320 in the key when the reader is in its most downward position. Each sensor produces a distinctly different output signal when confronting the metal than when confronting a hole. Thus, in operation, the operator can slip the reader over the top end of the key and move it downwardly to its bottom-most position, during which process the microprocessor RTU 94 will receive information identifying the combination of holes present in the particular key, and by adding the number information for the six pairs of hole positions, obtain the identifying number for that key, in this case assumed to be number 322. The signal produced by bottom opening 320 indicates to the microprocessor that a complete key reading has been obtained, rather than a partial reading which might result from passing the reader only partway down the key and then removing it, for example. As a further check, the microprocessor may include a device for checking that the number which it derives from the key is one of those which is known to be valid, i.e. has been assigned to at least one of the containers.

Figure 4:
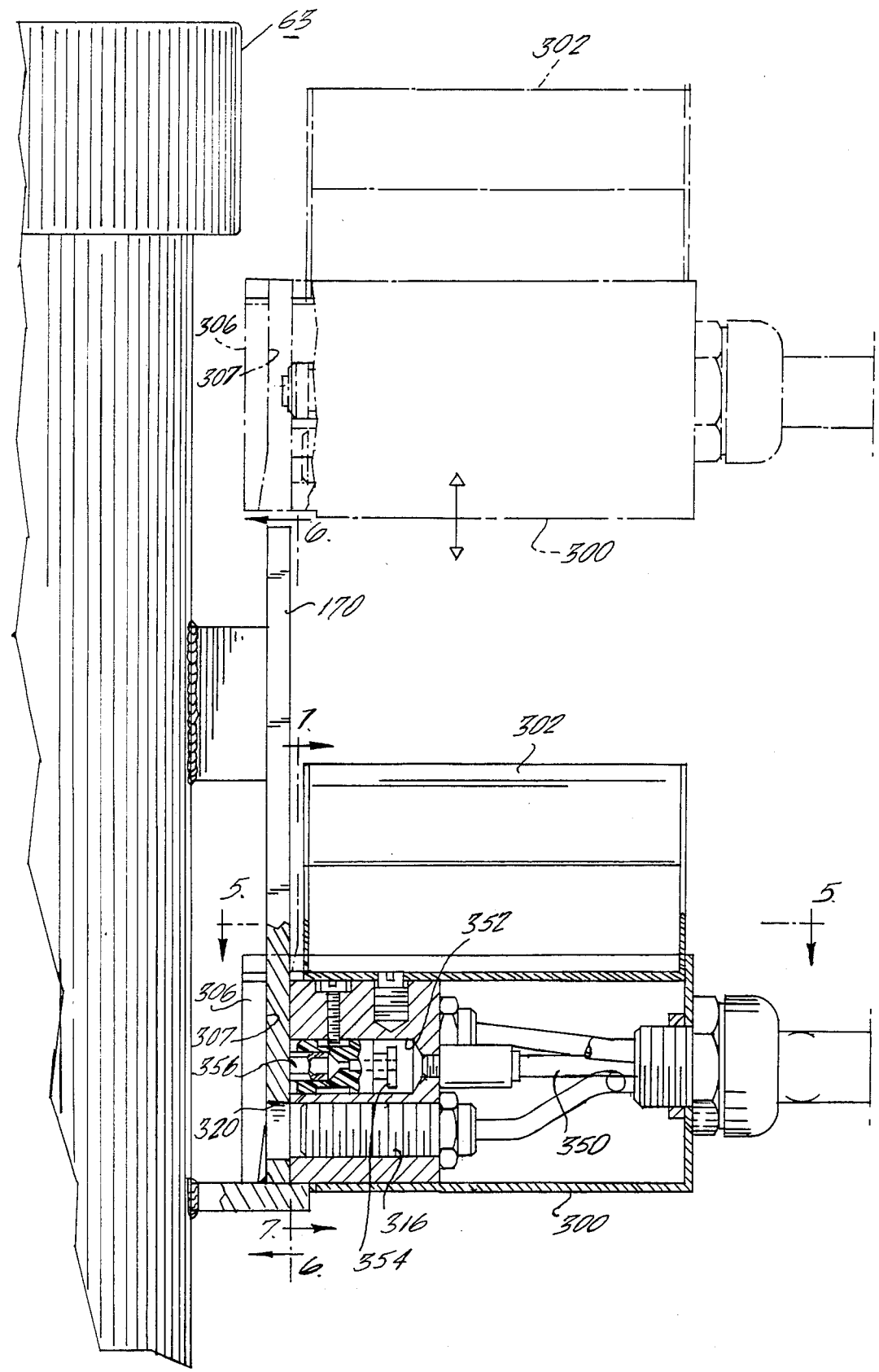
FIG. 4 is an enlarged elevational view of the key and key reader of FIG. 2.

The key reader in this example also comprises an arrangement for supplying air under pressure through tube 350 (FIG. 4) into chamber 352, wherein it acts upon piston head 354 to urge the piston head outwardly, to the left in FIG. 4, so as to urge a cylinder 356 of elastomeric material against the surface of the key 170. The frictional resistance thus created between key and cylinder 356 resists removal of the key reader, thus serving as an effective lock for the present purposes. The air valve for controlling the air pressure supply to the pneumatic lock may be positioned within the RTU casing, and is normally OFF, being turned on in response to determination by the RTU that a proper key reading has been accomplished, and remaining ON until the end of the dispensing and reader-head removal sequence at this station, at which time it is automatically turned OFF again by the RTU.

A typical spice cart, key, and key reader for it are illustrated in FIG. 8. The wheeled cart 400 in this example has five shelves, each divided into two sections or compartments such as 408 by vertical posts such as 402,404 so that ten different trays such as 406 can be slid into position in the ten compartments thus formed. Each compartment such as 408 is provided with an identifying key such as 410, which except for its hole code may be like key 170 previously described, and which may be read as described above by a key reader 412, which in turn is like key reader 152 previously described with particular respect to FIG. 4 except that, shown in FIG. 10, it is provided with an arrangement for unlocking the normally-locked tray retainer 418.

As is particularly clearly illustrated in FIG. 9, a hole 419 is provided through the key 410 at the position 172 of FIG. 6, so that when the key reader achieves the fully-read position illustrated in FIG. 9 the air then being applied to the piston head 354a finds a path through the center of the piston and through the hole 419 in plate 410. Hole 419 also communicates through a tube 442 to an air cylinder 443 containing a slidable locking pin 444, which is normally spring-biased into a locking position in which locking pin 444 extends into a locking chamber 445 in rotatable handle 446. In its normal locking position, pin 444 prevents rotation of handle 446, and hence of the shaft 448 secured thereto, so that the tabs such as 450 secured to rod 448 block the passageway in and out of the tray compartment, thus locking a spice tray into the cart once it has been placed inside the compartment. However, when the reader unit reaches the bottom end of its reading stroke, and air is therefore automatically applied to unlock handle 446, the handle can be rotated upwardly so as to rotate the tabs 450 upwardly and out of the way, thus unlocking the tray compartment of the spice cart so that tray removal or insertion may be accomplished. After return of handle 406 to its downward position and upon subsequent removal of the reader, the pneumatic air-supply source is disconnected and the handle 406 is locked in position by spring return of the locking pin 444 into its locking chamber 445.

Referring now to the details of the mechanical and electrical arrangement shown in FIG. 11 for the apparatus at the ingredient-receiving station, it is assumed in this example that the two blending kettles shown are the blending kettles 10A and 10B of FIG. 1, which are used alternately to produce a soup, such as chicken soup as an example. Since the two kettles and their mode of operation and associated equipment may be identical, only one need be described.

The blending kettle in this example is provided with three outlet conduits 500, 502 and 504 at its bottom, each containing an appropriate remotely-controlled valve, whereby the contents of the tank may be delivered to drain, to a soup-holding tank 12 of FIG. 1, or to apparatus for filling soup cans with soup. Three weight-sensing load cells such as 508 may also be provided, together with an appropriate conventional totalizer 510, the output of which is delivered to the weight scale indicator 515 and the microprocessor RTU 520. In this example, and not as part of the present invention, RTU 90 may also be supplied with temperature information from the temperature sensing device 530 mounted in the kettle, and with product-level information from a level sensing device 532 also mounted to the kettle.

In this case an operator control panel 600 is shared by the kettles 10A and 10B, and provides various controls for the various steps in the emptying, cleaning, blending and cooking operations. An agitator control device 532 may also be employed, controlled from the operator control panel, to provide any desired agitation of the blended components. Prompting readouts for use in connection with the use of the control panel may be displayed on the two microprocessor RTU read-out displays, as indicated in FIGS. 12 and 13 for the cases in which the operator is prompted to answer on the RTU control panel whether a container has been dumped into kettle 10A and the dumper returned to its down dosition (FIG. 12), and whether the kettle 10B has been cleaned and emptied (FIG. 13).

FIG. 11 shows the container such as 63 placed on the dumper, with the key reader 540 temporarily connected to key 154, as it would be at the end of a reading procedure, and also shows the same container in dotted-line position, pivoted upwardly over the kettle in a position such as to dump the contents into the kettle. A control button 542 is shown which, when pushed, causes the dumper to go through its dumping cycle, provided the dumper is not then locked out of operation. Normally, i.e. in the absence of a transport container, a dumper lock 546 locks the dumper against operation. This may be accomplished mechanically, for example by means of a pin which prevents rotation of the axle of the dumper, or hydraulically in the case in which the dumper is hydraulically operated, by means of a hydraulic control valve which is normally closed so that pushing of the actuator for the dumper will not result in hydraulic actuation of the dumper.

The key reader 540 is connected through the umbilical cable 562 to the RTU 90, and may be substantially identical, with respect to the reader head, the key arrangement and the umbilical cable, to those described previously with respect to the corresponding units used at the bulk-ingredient dispenser stations. In this case, dumper lock 546 is controlled, over line 564 from the microprocessor RTU 90, so that an appropriate signal on line 564 will unlock the dumper lock, permit operation of the dumper, and transfer the contents of the container into the kettle as desired. In the present example, it is preferred to remove the key reader before the actual physical dumping occurs, and accordingly the unlocking of the dumper lock is preferably by means of an arrangement which holds the dumper unlocked and does not relock it until after it has completed its cycle, even though the key reader has meanwhile been removed.

As will be described more fully presently, a signal on line 564 from the microprocessor RTU which enables the dumper, and thus overcomes the previous inhibition against this operation, is produced only when the number read by the reader 540 is the same number which was read at the ingredient-dispensing station whence the container was taken and where the proper kind and amount of ingredients were put into the container. The necessary interchange of information is provided by the communications cable 122, which transmits the container number read at the ingredient dispensing station to the RTU 90 and the chef's control panel 559 at the kettle station for comparison, by conventional electronic means, with the number subsequently read from the container presented at the dumper. The comparison may be done by means of a conventional electronic circuit which produces a LOW output when the two signals at its two inputs represent different numbers, and changes to HIGH when the two input signals represent the same number.

In the case of ingredients carried by the spice cart, the electronic operation is basically the same. However, in that case the key reader is of course applied to the key or keys on the spice cart and, as at the spice cart dispensing station, the corresponding spice cart compartment is automatically unlocked by application of air pressure described previously; the air pressure is only applied to unlock the cart when the RTU 90 determines that the number read from the cart compartment key is the same as that which was transmitted to it through the communications cable from the spice unit RTU. Unless this comparison and coincidence occurs, the cart compartment will not unlock, and the operator is warned to look for problems such as the fact that the wrong container has been delivered to the kettle.

In the overall operation of the system described above, one basic aspect is as follows. Considering first the case of the bulk ingredients, an employee is instructed by the manager or chef, who is controlling operations at a given kettle to make a given soup, to take a container to a bulk ingredient dispenser and to put a certain amount of the product from that dispenser into the container and to bring the container back to a particular kettle. At the bulk product dispenser station, the employee applies the key reader to the key of the container, electrical signals thus generated being transmitted back to the RTU and operator's control panel of the particular kettle to which he is to supply ingredients where the number is stored. When the employee has completed his dispensing of the bulk ingredient he takes the container back to the appropriate kettle, where the key reader is applied to the key of the container and the electrical signal thus generated is applied to the local RTU at the kettle for comparison with the number previously sent to the operator's control panel from the remote bulk-product dispenser station. Electrical comparison of these two numbers enables a determination of whether the same container which was being filled at the dispensing station has now reached the appropriate kettle. If the remotely read and transmitted container number is not the same as the locally read container number at the kettle, this is a warning that an error has occurred, and an investigation and correction is in order.

In the case of the spice carts, the operation is basically the same except that the spice product is ordinarily weighed out into a container by a special employee in the spice room, placed in trays, placed into the cart compartments where it is locked-in as described above; and, at the blending kettle, the compartment can only be opened when the number read from that compartment by the local reader at the kettle agrees with the number which was transmitted to the kettle when that same key was read at the spice dispensing room.

While these basic functions of remote reading of the number of a container, transmission of the number to and storage thereof at a blending station, and later comparison of it with the stored number of the container brought ot the blending station can be provided by very simple, unsophisticated equipment, it is preferred to provide for a number of other additional functions as well, and to this end the above-described arrangement is preferably utilized in which microprocessor control devices are positioned at each ingredient dispensing and ingredient receiving station. One such preferred function is that described above wherein a microprocessor checks the validity of the number read by the key reader and then actuates a pneumatic circuit to hold the reader locked to the key until the desired weight of product has been dispensed into the container, as illustrated in the arrangement of FIG. 2. Futhermore, in this arrangement the locking device 160 is also provided, which normally locks the dispensing hopper so that no dispensing can occur until the microprocessor confirms that a valid number has been read from the container key, at which time the manually operable bottom valve can be opened and the product allowed to be dispensed into the container under the control of the operator. Upon subsequent final closing of the bottom of the hopper and removal of the reader, the microprocessor relocks the bottom valve in closed position.

Preferably, in arrangements such as that as FIG. 2, the microprocessor also monitors the increasing weight of container contents, and displays information as to how much product should be dispensed into the container. By comparing the instantaneous amount of dispensed material with that desired, the operator can determine when they are substantially equal and at such time terminate dispensing.

Similarly, at the kettle stations the microprocessors can be programmed to produce prompting instructions for the manager or chef throughout the complete soup-producing and kettle-cleaning process. The master computer and printer 120 can be used to deliver instructions to the blending stations, for example as to what soup is to be made for the day and in what quantities, and can print out a record of all the transactions which have taken place on the soup floor; in the latter event, it is preferred that it also provide a running time record, along with the printed material so as to provide a record at a later date as to exactly what happened and when. In addition, each operator may be caused to insert his assigned individual identification number into the various RTU's as he uses them, so that the final printout may also contain information as to who performed various functions at a given time.

In one particular use of the system, for example, a chef in charge of a pair of adjacent kettles may be given instructions at the beginning of the day as to what soup is to be made in his kettles, and in what quantities, i.e. how many batches. He then consults a log book which gives a certain number for such a soup recipe, for example 28, and provides one or more employees with tickets or cards on which are marked the soup number, i.e. 28, and the kind of ingredients to be fetched and brought to that kettle by that particular employee. If the employee is, for example, sent to fetch diced chicken, in the preferred embodiment he would wheel one of the large containers on a wheeled dolly to the weigh platform where diced chicken is dispensed, and position it on the weigh platform. He would then enter his individual identification number and the number of the batch of soup to be made, and then apply the reader to the key.

Figure 3:
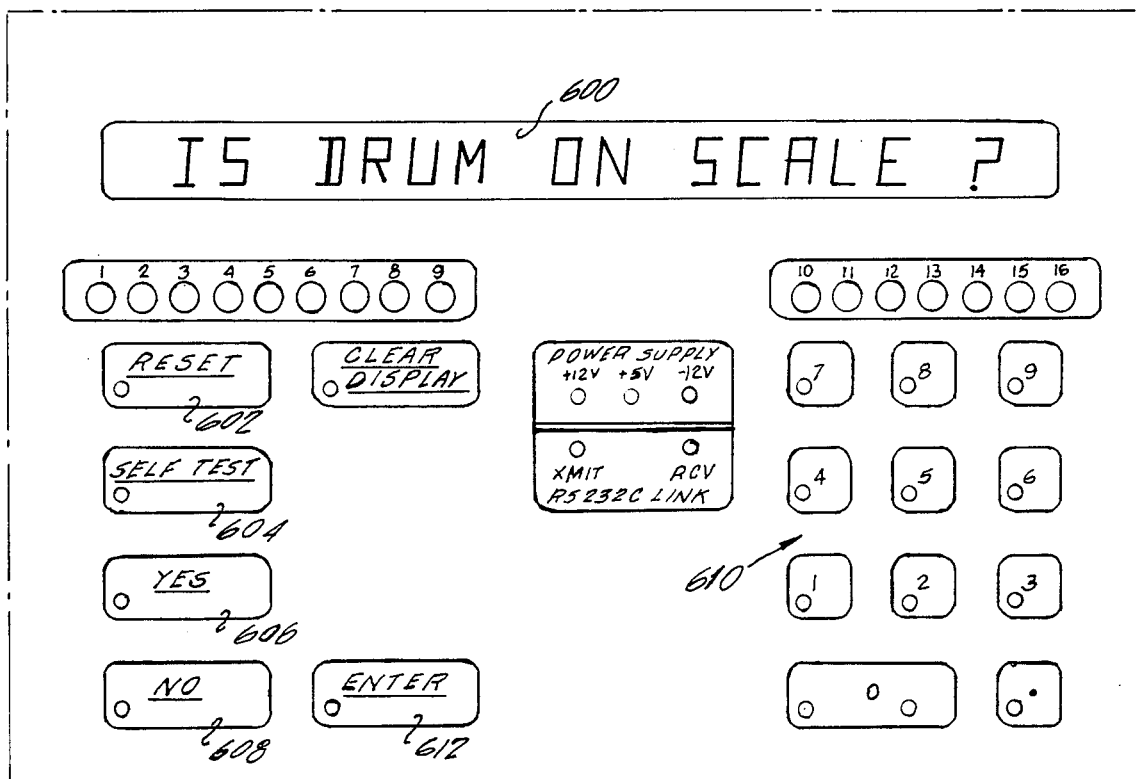
FIG. 3 is a front elevational view of the control panel of a typical microprocessor means used in a preferred embodiment of the invention.

FIG. 3 shows one form of control panel at a RTU which is employed in the preferred embodiment. It has a alphanumeric readout 600, a "soft" reset button 602 which when operated will reset the unit to a starting point without, however, erasing material which is in memory; a "self-test" button 604 which may be pushed to cause the unit to self-test itself; a "YES" button 606 to be pushed by the operator when he wishes to indicate the answer YES; and a NO button 608 which the operator pushes when he wishes to respond NO to a question presented on the display 600. Also provided is a base-10 key pad 610 with decimal point key, running from 0 to 9, whereby the operator may place any number he desires into the RTU. An "ENTER" key 612 is also provided, which the operator uses when he wishes to enter information or answers; that is, after he has pushed the keys to input a certain set of numerals, or one of the special keys to respond with a YES or NO, such answer is actually entered into the RTU by subsequent pressing of the ENTER button. In this embodiment there are also provided a row of lights numbered 1 to 16 which may be connected so as to provide indication of the proper operation of the key reading device.

The same display and control panel is, for convenience, used throughout the preferred embodiment of the system shown. It enables the internal program to display questions or commands upon the display 600, and enables the operator to insert information and responses as described above.

Utilizing such an RTU, the employee dispatched to a bulk ingredient dispenser would first enter his personal identification number, then the product number as described previously, followed by application of the reader to the key of this container. Assuming everything is in order, the reader is thereby locked to the container key and the RTU instructs him to dispense product, which he can now do because the lock 160 in the bottom of the hopper has been released. By operating the handle he dispenses the desired quantity which is displayed upon the RTU display. In one preferred embodiment, so long as he has not put in sufficient product the reader will not be released from the container key, while if he puts in an excessive amount it also will not be released and cannot be released until a supervising person authorizes such release and does so by means of a special key; such an overfill and its approval by release are preferably recorded upon the computer records maintained by the master control and print unit.

In the case of the spice carts, analogous operation takes place except that the spice room attendant weighs out the material, and the control is by the locking and unlocking of the cart compartments rather than by locking and unlocking of the dispensing apparatus.

In addition to this type of operation, the units at the blending kettles may provide a complete prompting response program for the chef or manager in control, asking him whether he has taken or supervised all of the successive steps required in the process, including such things as emptying the vessel kettle to drain, entering cleaning solutions into it, completing the cleaning operation, looking for and dumping the various successive types of ingredients, etc. The weighing-out of ingredients need not be manual, but may be done automatically, either by push-buttom authorization of the microprocessor-displayed weight or entirely by the microprocessor without employee participation. Further, the supply of all of the other main liquid ingredients to the blending kettles may be placed under control of computers and monitored at the chef's control panel.

Many other forms of embodiments of the invention may be envisioned without departing from the scope thereof. In some cases these may involve simplifications of the system where all of the functions referred to above are not required, or increasing the sophistication of the system where a greater degree of guarding against error is required. The degree of sophistication one chooses to employ depends upon the economics of the particular application envisioned. In any event, however, in any of such systems, according to the present invention the possibility of error due to dumping of the wrong ingredients into a given vessel is mitigated by the basic arrangement of a machine-readable identification means attached to each container which represents a number or code uniquely identifying that container, an arrangement at a dispensing station which machine-reads that number and transmits it to the kettle to which the container is to be delivered, an arrangement at the latter kettle for again reading the identifying indicia from the container when it is delivered there, and an arrangement for comparing the number transmitted to the kettle station with that read by the apparatus at the kettle station to assure that they are the same, and preferably to permit dumping only when they are thus determined to be the same.

While the invention has been described with respect to specific embodiments in the interest of complete definiteness, it will be understood that it may be embodied in a variety of forms differing substantially from those shown and described, without departing from the spirit and scope of the invention as defined by the appended claims.

What is claimed is:

1. The method of verifying the delivery of the proper container of a group of containers from a product-dispensing station to a particular product-receiving station, comprising:

providing respectively different machine-readable container-identifying means secured to said containers;

presenting one of said group of containers at said product-dispensing station;

machine-reading said container-identifying means of said one container at said product-dispensing station to produce first signals representative of said container-identifying means of said one container;

thereafter delivering said one container to said product-receiving station;

at said product-receiving station, machine-reading said container-identifying means of said one container to produce second signals representative of said container-identifying means secured to said one container; and comparing said first and second signals to produce at said delivery station third signals indicating that said one container presented at said product-receiving station is said proper container.

2. The method of claim 1, comprising transmitting said first signals to said product-receiving station, storing them at said product-receiving station, and comparing said first and second signals to produce said third signals only if said first and second signals represent the same container-identifying means.

3. The method of claim 2, comprising permitting said dumping only after said third signals have been produced.

4. The method of claim 2, comprising placing product into said one container at said product-dispensing station only after said machine-reading of said container-identifying means thereof at said product-dispensing station.

5. The method of claim 3, wherein said product is delivered to said product-receiving station in a locked compartment, and said permitting of dumping comprising unlocking said compartment in response to said third signals.

6. The method of claim 3, comprising inhibiting said dumping prior to said dumping by disabling the operation of an automatic dumper for dumping the contents of said particular container into said receiving vessel, and said permitting of dumping comprises enabling said automatic dumper in response to said third signals.

7. Apparatus for enhancing the reliability of delivery of an ingredient into a particular blending kettle at a kettle station, from an ingredient-dispensing station remotely positioned with respect to said kettle, comprising:

a transport container having container-identifying machine-readable indicia means secured thereto;

first indicia-reading means at said ingredient-dispensing station for reading said machine-readable indicia means to produce first signals representative thereof;

second indicia-reading means at said kettle station for reading said machine-readable indicia means to produce second signals representative thereof;

means for storing said first signals and for comparing them with said second signals to produce third signals only if said first and second signals represent the same machine-read indicia;

transfer inhibiting means for inhibiting the transfer of ingredients from said transport container to said blending kettle; and control means for controlling said transfer inhibiting means to permit said transfer upon the occurrence of said third signals.

8. The apparatus of claim 7, wherein said control means comprises means responsive to said third signals for controlling said transfer inhibiting means.

9. The apparatus of claim 7, wherein said transfer inhibiting means comprises automatic dumping means and means rendering said dumping means inoperative, and said control means comprises means for enabling said dumping means.

10. The apparatus of claim 7, wherein said transfer inhibiting means comprises a locked compartment containing said ingredient, and said control means comprises means for unlocking said locked compartment in response to said third signals.

11. A food-ingredient assembling system for helping to assure that a particular type and/or amount of ingredients deposited in one of a plurality of transport containers is transported by said one of said transport containers to a particular one of a plurality of ingredient-receiving containers, and that said ingredients are transferred from said one transport container to said particular one of said plurality of ingredient-receiving containers, comprising:

a plurality of transport containers having respectively different machine-readable identification means affixed thereto identifying each container;

at least one ingredient-dispensing station for dispensing ingredients into said transport containers;

a plurality of ingredient-receiving containers for receiving ingredients carried thereto from said ingredient-dispensing station in said transport containers;

first identification-reading means at said at least one ingredient-dispensing station for reading said identification means of each of said transport containers presented thereto to produce first electrical signals representative of the identities of the transport containers presented to it;

second identification-reading means associated with each of said ingredient-receiving containers for reading said identification means of each of said transport containers presented thereto to produce second electrical signals representative of the identities of the transport containers presented to each of said ingredient-receiving containers;

means for comparing said first electrical signals with said second electrical signals to produce third signals indicative of when said one transport container is presented to said particular one of said plurality of ingredient-receiving containers;

ingredient transfer means for transferring said ingredients from said transport containers to said ingredient-receiving containers; and transfer control means for disabling said ingredient transfer means at said particular ingredient-receiving container in the absence of said third signals, and for enabling said ingredient transfer means in response to said third signals, to permit transfer of said ingredients from said one transport container only to said particular one of said plurality of ingredient-receiving containers.

12. The system of claim 11, wherein said means for comparing signals comprises: signal-storing memory means, means for transmitting said first signals from said first identification-reading means to said memory means for storage therein; signal comparator means having a pair of input terminals and responsive to signals applied to its input terminals representing the same number to produce said third signals; means for supplying to one of said pair of input terminals of said comparator means, from said memory means, those of said stored first electrical signals produced by said identification means of said one transport container; and means for supplying to another of said pair of input terminals those of said second electrical signals produced by said second identification-reading means of said particular one of said ingredient-receiving containers.

13. The system of claim 11, wherein said means for comparing signals comprises: a signal-storing and signal-comparing microprocessor means at each of said ingredient-reading containers; means for transmitting, from said at least one ingredient-dispensing station to one of said microprocessors, first electrical signals representing the identity of said one transport container; means for storing said transmitted first electrical signals in said one microprocessor means until the identity of said one transport container is read by said second identification-reading means associated with said particular one of said ingredient-receiving container; the microprocessor means at said particular one of said ingredient-receiving containers comprising comparator means for comparing said stored transmitted first electrical signals with said second electrical signals read at said second identification-reading means at said particular one of said ingredient-receiving container, to produce said third signals when said stored transmitted first electrical signals are the same as said last-named second electrical signals.

14. Apparatus in accordance with claim 11, wherein said machine-readable identification means comprises a metal plate permanently affixed to said container and containing a coded array of holes through it, and said first and second identification reading means each comprises means for sensing said coded array to produce a signal indicative of the number represented by said coded array.

15. Apparatus in accordance with claim 14, wherein said coded array comprises rows of holes, with at least one hole per row.

16. Apparatus in accordance with claim 14, wherein said means for sensing said coded array comprises metal-sensing means positioned adjacent said identification means.

17. A system for assembling relatively large batches of bulk ingredients and relatively small batches of small-quantity ingredients at a particular one of a plurality of blending kettles positioned at a particular kettle station, for subsequent dumping therein to make soup, comprising:

a first plurality of bulk-ingredient storage stations remote from said particular kettle station;

a second plurality of stations storing small-quantity ingredients;

a plurality of microprocessor units, one at each of said first and second plurality of stations and one at each of said blending kettles;

data communication lines providing digital information exchange between the mircoprocessors at each of said first and second plurality of stations and those at said blending kettles;

a plurality of transport containers each having a machine-readable coded key permanently affixed thereto representing a number assigned to that container;

a plurality of key readers, one at each of said first and second plurality of stations and one at each of said blending kettles, each adapted to read out to the associated microprocessor the coded number of any of said keys submitted to it for reading;

means for transmitting the coded number read out at any of said first and second plurality of stations to the kettle station to which the particular ingredients are to be delivered;

means at each of said kettle station for storing said coded numbers transmitted thereto until the corresponding container has been delivered to that kettle station;

means for comparing said transmitted number at said particular kettle station with that read from the coded keys of containers presented at said particular kettle station, to produce a control signal indicative of whether these two numbers are the same;

inhibiting means for preventing dumping of said containers into said kettles; and means responsive to said control signal to enable said dumping of said containers into said particular kettle.

18. The apparatus of claim 17, wherein each of said bulk-ingredient storage stations comprises normally-locked means for dispensing said bulk ingredients, and means repsonsive to reading of a valid number from one of said keys to unlock said dispensing means.

19. The apparatus of claim 17, wherein said each of said bulk-ingredient storage stations and said stations storing small-quantity ingredients comprise means for temporarily locking its key reader to the key of a transport container presented thereto, in response to reading by said last-named reader of a valid number from said last-named key.

* * * * *